(12) United States Patent
Dickens et al.

(10) Patent No.: US 7,843,852 B2
(45) Date of Patent: Nov. 30, 2010

(54) PORTABLE DEVICE FOR FIBRE CHANNEL CONFIGURATION AND ANALYSIS

(75) Inventors: Louie Arthur Dickens, Tucson, AZ (US); Laurence William Holley, Tucson, AZ (US); Nancy Vedder Ryson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 12/108,385

(22) Filed: Apr. 23, 2008

(65) Prior Publication Data

US 2009/0269052 A1    Oct. 29, 2009

(51) Int. Cl.
 *H04B 17/00*    (2006.01)
(52) U.S. Cl. .................................. 370/254; 370/401
(58) Field of Classification Search .................. 370/401, 370/254, 241, 335, 462, 351, 130, 232, 252; 709/227, 220
See application file for complete search history.

(56) References Cited

U.S. PATENT DOCUMENTS

| | | | |
|---|---|---|---|
| 6,185,203 B1 * | 2/2001 | Berman | 370/351 |
| 6,477,171 B1 | 11/2002 | Wakeley et al. | |
| 7,382,790 B2 * | 6/2008 | Warren et al. | 370/401 |
| 2002/0104041 A1 * | 8/2002 | Jibbe | 714/37 |
| 2002/0170004 A1 * | 11/2002 | Parrett et al. | 714/43 |
| 2003/0221026 A1 * | 11/2003 | Newman | 710/8 |
| 2006/0155831 A1 * | 7/2006 | Chandrasekaran | 709/220 |
| 2008/0089336 A1 * | 4/2008 | Mercier et al. | 370/392 |
| 2009/0116404 A1 * | 5/2009 | Mahop et al. | 370/254 |

FOREIGN PATENT DOCUMENTS

EP    1775894 A1    4/2007

* cited by examiner

*Primary Examiner*—Thong H Vu
(74) *Attorney, Agent, or Firm*—Griffiths & Seaton PLLC

(57) ABSTRACT

Apparatus, method, and computer program product embodiments for analyzing and configuring a fibre channel link and topology using a portable device are provided. A network microchip is programmed to select at least one of an available plurality of operating modes based on a first user input. The plurality of operating modes include a manual speed selection mode for manually selecting a link speed based on a second user input, an auto speed selection mode for automatically negotiating a highest supported link speed, an auto topology negotiation mode for discovering and reporting all possible port configurations, and a manual topology selection mode for selecting a fibre channel topology based on a third user input.

20 Claims, 6 Drawing Sheets

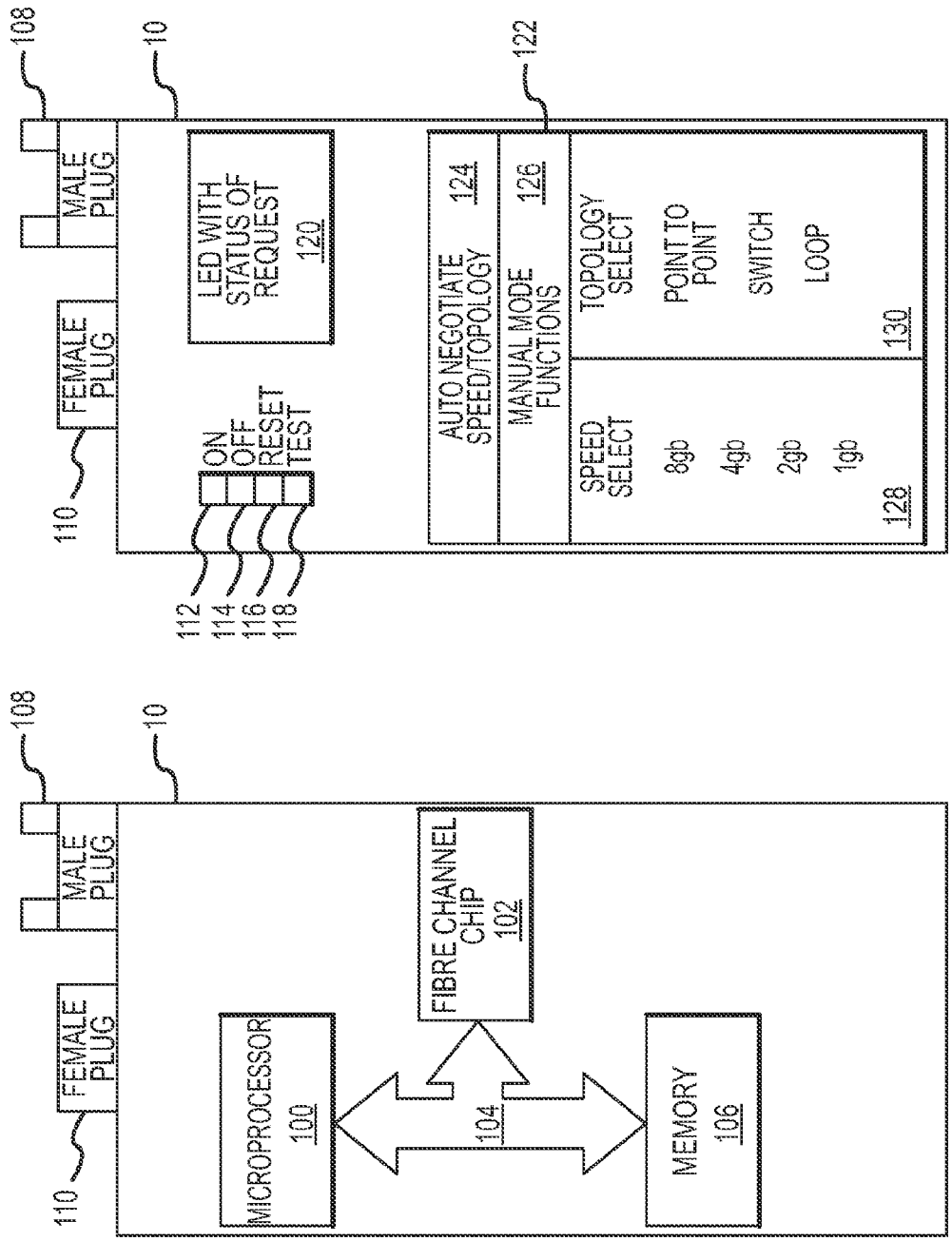

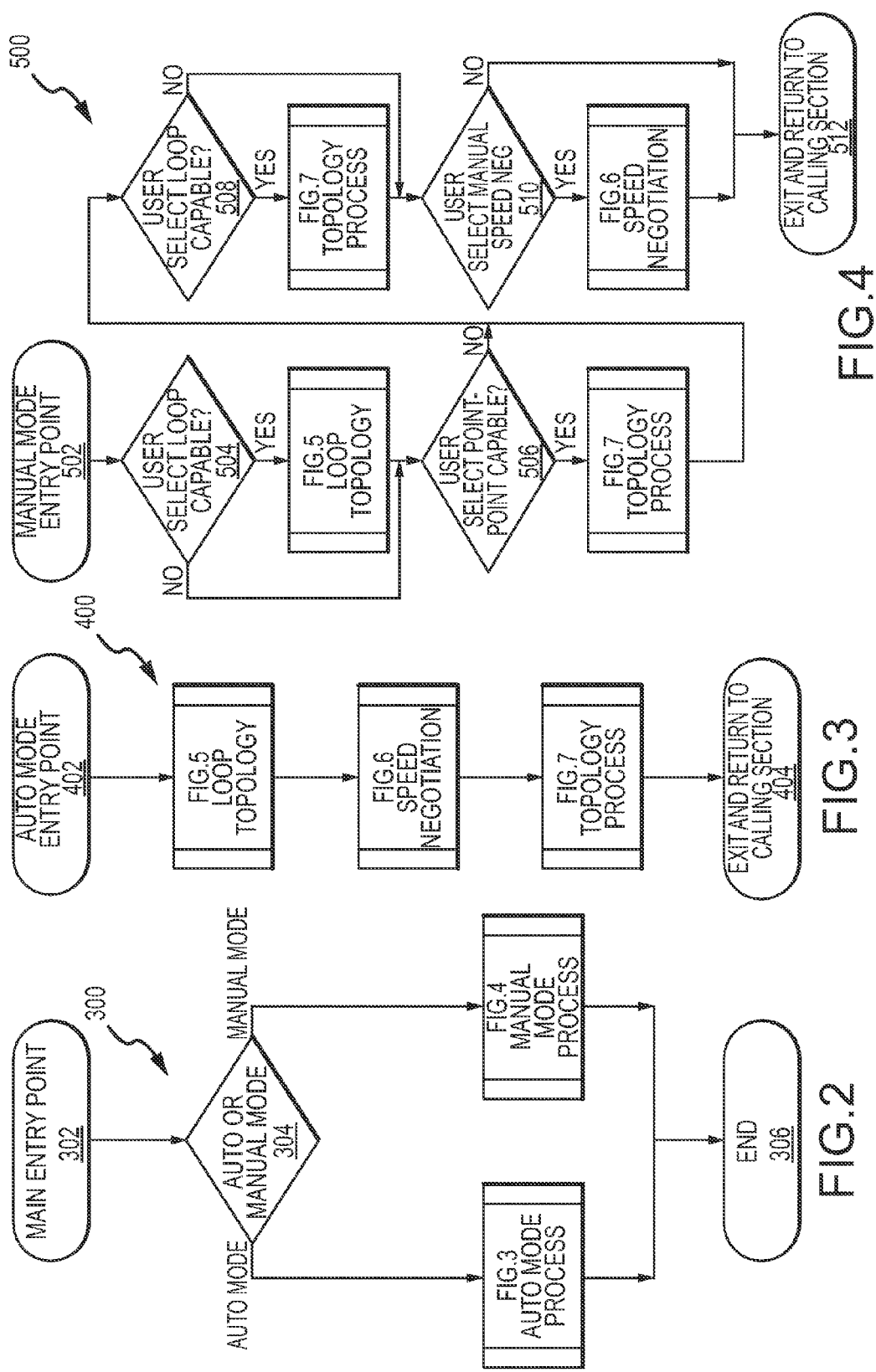

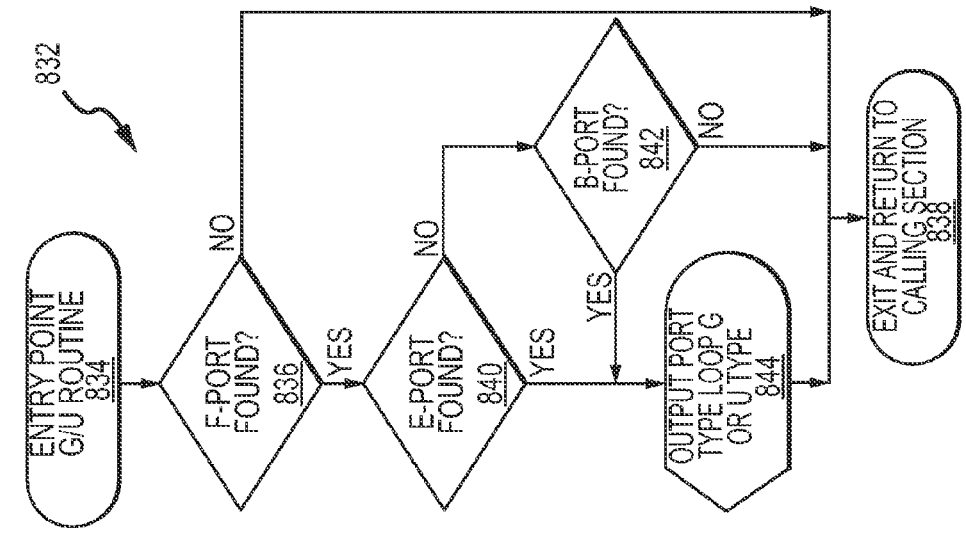
FIG. 7C
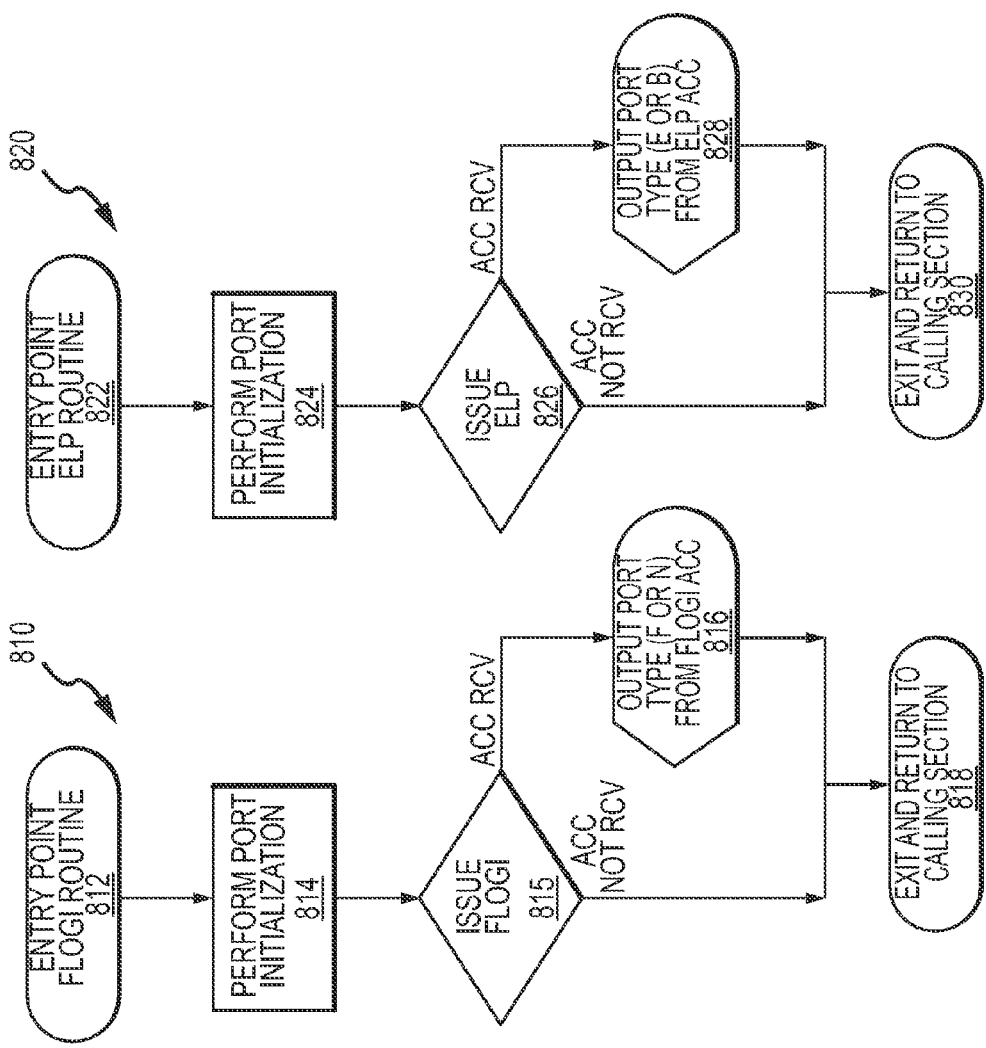
FIG. 7B
FIG. 7A

PORTABLE DEVICE FOR FIBRE CHANNEL CONFIGURATION AND ANALYSIS

BACKGROUND OF THE INVENTION

1. Field of the Invention

The present invention relates in general to computers, and more particularly to apparatus, method and computer program product embodiments for fibre channel analysis, configuration, and troubleshooting in a computing environment using an inexpensive, portable device.

2. Description of the Related Art

Network adapter devices are hardware units that connect computer devices to a communication network. Adapters may be found in virtually every computing environment having network connectivity. Most adapters are not labeled with their attributes, such as link speed and network topology capabilities. Instead, adapters generally are given a model number and a serial number that must be looked up in the manufacturer's database to obtain their speed and topology capability.

Cross referencing manufacturer information with network attributes has limited effectiveness, in that the model number and/or serial number must be physically associated with the adapter, and the adapter must be accessible. An additional known solution has been to attach an analyzer and obtain a trace. However, conventional analyzers are expensive and are not portable. In addition, only users with a high degree of knowledge may evaluate the results of such a trace. An additional conventional solution has been to examine the configuration console provided by the manufacturer. This solution is only possible, however, if a communication link can be established.

When an adapter is installed in a system, in many cases the system must be powered down for a user to gain access to the adapter to obtain information or to perform varying configuration functionality. Such a scenario may be disruptive and time consuming to the user. For example, if a node port (FX, NX, U/G) is set to auto topology negotiation and auto speed negotiation, as is usually the default setting, then the topology and speed negotiation will occur initially at the same time. It is difficult to determine which of these negotiations is at fault when a link fails to initialize. End users frequently use a trial and error method of changing settings until they get the link established. This methodology may result in the link operating at a less than optimal position.

SUMMARY OF THE INVENTION

In light of the foregoing, a need exists for a simple, inexpensive device that can be used to obtain the capabilities of fibre channel devices such as adapters and display the results in some manner to a user. In addition, it is useful for such a device to include additional troubleshooting functionality to assist in negotiation scenarios as described above.

Accordingly, apparatus, method, and computer program product embodiments for analyzing and configuring a fibre channel link and topology using a portable device are provided. A network microchip is programmed to select at least one of an available plurality of operating modes based on a first user input. The plurality of operating modes include a manual speed selection mode for manually selecting a link speed based on a second user input, an auto speed selection mode for automatically negotiating a highest supported link speed, an auto topology negotiation mode for discovering and reporting all possible port configurations, and a manual topology selection mode for selecting a fibre channel topology based on a third user input.

In another embodiment, by way of example only, a method for analyzing and configuring a fibre channel link and topology in a computing environment using a portable device is provided. At least one of an available plurality of operating modes is selected based on a first user input. The at least one operating mode is executed. Executing the at least one operating mode includes at least one of manually selecting a link speed based on a second user input, automatically negotiating a highest supported link speed, discovering and reporting all possible port configurations, and manually selecting a fibre channel topology based on a third user input.

In still another embodiment, again by way of example only, a computer program product for analyzing and configuring a fibre channel link and topology in a computing environment using a portable device is provided, the computer program product comprising a computer-readable storage medium having computer-readable program code portions stored therein. The computer-readable program code portions comprise a first executable portion for selecting at least one of an available plurality of operating modes based on a first user input, and a second executable portion for executing the at least one operating mode. Executing the at least one operating mode includes at least one of manually selecting a link speed based on a second user input, automatically negotiating a highest supported link speed, discovering and reporting all possible port configurations, and manually selecting a fibre channel topology based on a third user input.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 1A illustrates an exemplary portable device for fibre channel link and topology analysis and configuration according to the present invention in a first view;

FIG. 1B illustrates the exemplary portable device of FIG. 1A in a second view;

FIG. 2 illustrates an exemplary method to select an auto or manual operating mode;

FIG. 3 illustrates an exemplary auto operating mode;

FIG. 4 illustrates an exemplary manual operating mode;

FIG. 7A illustrates an exemplary Fabric LOGIn (FLOGI) subroutine;

FIG. 7B illustrates an exemplary ELP subroutine; and

FIG. 7C illustrates an exemplary subroutine to determine if a port type is Generic/Universal (G/U).

DETAILED DESCRIPTION OF THE DRAWINGS

Figure 5:
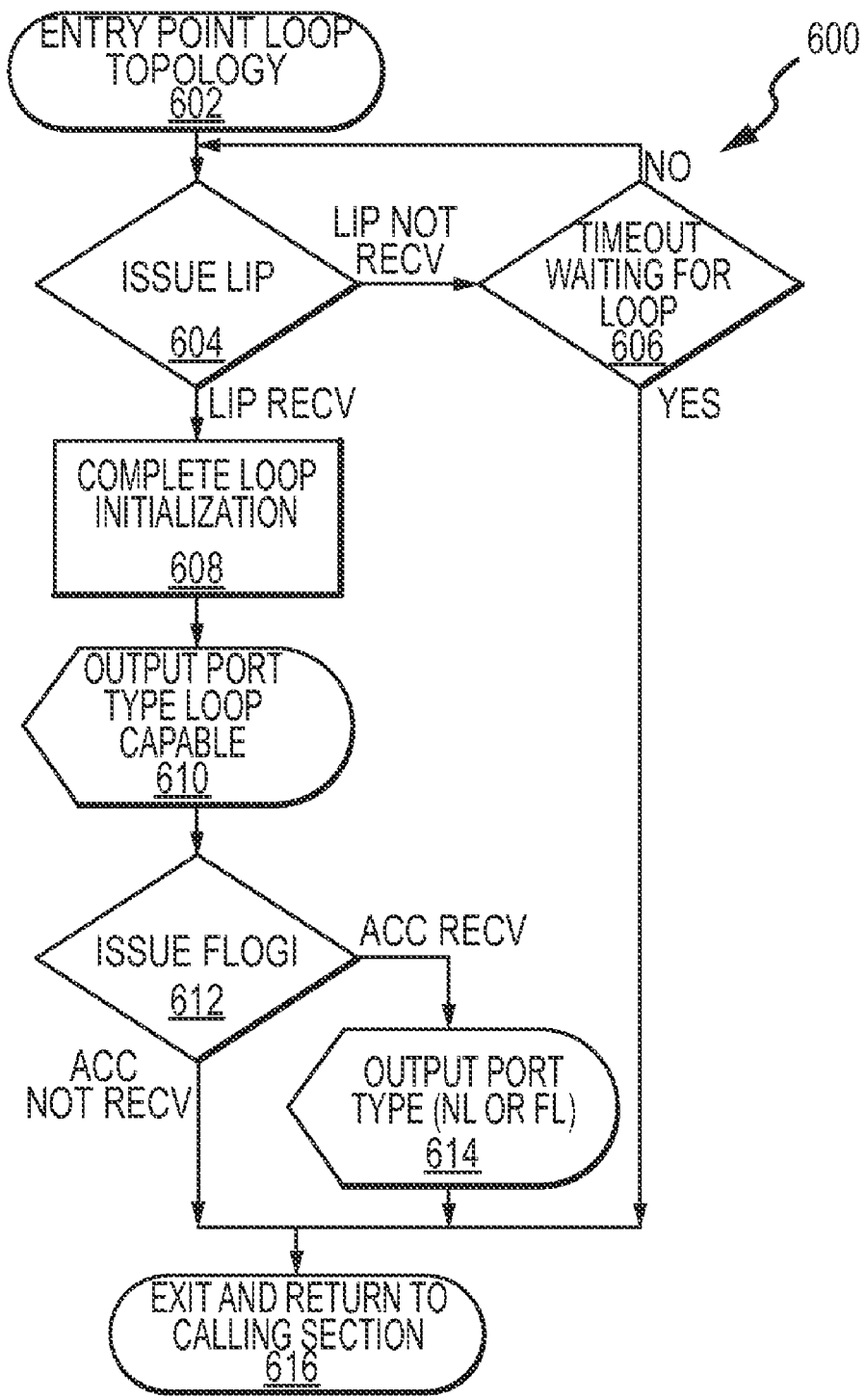
FIG. 5 illustrates an exemplary loop topology subroutine.

The following description and claimed subject matter feature exemplary embodiments of mechanisms to provide fibre channel link/topology analysis and configuration using a low-cost, portable device. The device may be adapted to allow a user the ability to select differing link speeds, differing network topologies. The device may be further adapted to troubleshoot network configurations. The device may be further adapted to display negotiated speeds, configurations, or errors to a user. Finally, the device (or components of the device) may be compatible with a Small Computer System Interface (SCSI) communication protocol.

The mechanisms described and claimed may assist the user in a variety of ways. They may allow the user to determine if a network device, such as an adapter, is performing correctly. They may facilitate the discovery of capabilities of an unknown network device. They may isolate a problem from a general network issue to a more specific speed negotiation problem or a topology negotiations problem. The mechanisms provide simplicity, portability, low-cost, ease of use, the ability to separate speed negotiations (and accompanying problems) from topology negotiations (and accompanying problems), and the ability to quickly and easily determine the capabilities of a network device.

The portable device as will be described, following may include a programmable network microchip, such as a fibre channel chip. In one embodiment, the network microchip may be programmed using an associated Application Programming Interface (API) to the microchip. The network microchip may be adapted to allow a user to select at least one of an available number of operating modes.

The operating modes may include the following: (1) a manual speed select mode, (2) an auto speed selection mode, (3) an auto topology negotiation mode, and (4) a manual topology selection mode. The manual speed select mode may allow the selection of different link speeds, such as a 1, 2, 4, or 8 gigabits per second (gb/sec), or any future speed that may be defined in the case of fibre channel network topologies.

The auto speed selection mode may utilize a speed list built using speeds supported by the network microchip. In this mode, the chip may be adapted to expect to negotiate to the maximum speed the microchip supports. If the device fails to negotiate the maximum speed, then a failure may be reported to the user, as well as a reporting of any other speeds that were successfully negotiated.

The auto topology negotiation mode allows for the portable device to discover and report all possible port configurations. For example, in fibre channel network topologies, a port configured as a generic (Gx) port is capable of becoming a F, E, or B port. In an exemplary auto topology negotiation operation in a fibre channel fabric, the device would report to the user that the connected port is a Gx port and is not loop capable.

In an exemplary manual topology selection in a fibre channel fabric, the user may configure the fibre port to be an FL port. If the device fails to configure to the port type specified, then again, a failure may be reported to the user. If a successful port configuration is made, the successful configuration may also be reported.

The network microchip may be adapted for a user to have the ability to select differing combination of speed and topology. The speed and topology analysis/configuration may be selected to occur simultaneously and concurrently or consecutively. For example, a user may select automatic speed negotiation mode, and then select manual topology negotiation mode. In another example, a user could select a manual speed negotiation mode with automatic topology negotiation (automatic topology negotiation mode).

Referring now to FIGS. 1A and 1B, an exemplary portable device 10 for analyzing and configuring a fibre channel link and topology is illustrated in two views. Device 10 is a housing including a variety of additional components. The housing may be composed of a lightweight material to add to portability. Device 10 incorporates a microprocessor 100, a network microchip 102 (while shown here as fibre channel, a variety of other communications protocols chips may be used for a particular implementation), a communications channel 104 therebetween, and a memory 106. Microprocessor may function to execute computer instructions relating to the network analysis and configuration functionality further described. Similarly, memory 106 may function to store the computer instructions, network and/or device information, and similar data. A male plug 108 and female plug 110 are incorporated into the device 10 housing in communication with the channel 104 to provide input/output (I/O).

Referring specifically to FIG. 1B, a variety of human interface mechanisms may be integrated into the device 10 housing, such as an on button 112, an off button 114, a reset button 116, and a test button 118. One skilled in the art will appreciate that the human interface mechanisms may be implemented in a variety of means, including switches, buttons, touchscreens, and the like. An status indicator 120 is adapted to display a status of the device 10, for example, a status of the execution of a selected operation mode. The indicator 120 shown is a light emitting diode (LED), yet again other indicator means may be employed.

Additional human interface mechanisms are shown below, such as graphical user interface (GUI) 122. GUI 122 includes a variety of selectable display data, such as an auto negotiate speed/topology selection 124, and a manual mode functions display selection 126. In the depicted example, a user may manually select one of an enumerated list of speeds 128 and fibre channel topologies 130, such as an 8 gb/sec speed and a Point-to-Point protocol (PPP).

FIGS. 2-7C, following, illustrate various methods for performing network analysis, configuration and troubleshooting using a portable device. As one skilled in the art will appreciate, various steps in the methods may be implemented in differing ways to suit a particular application. In addition, the described method may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

FIG. 2, following, illustrates the execution of a main routine for a speed selection and/or network topology (auto or manual) operating mode as shown by method 300. Method 300 begins (entry point 302) by determining if an auto or manual mode is selected (again, either by default or by the user) (Step 304). If an auto mode is selected, an auto mode process is executed as shown in FIG. 3, following. If a manual mode is selected, a manual mode process is executed as further shown in FIG. 4, following.

FIG. 4 illustrates the execution of an auto mode subroutine as shown by method 400. Method 400 begins (auto mode entry point 402) with the execution of a loop topology subroutine (shown in FIG. 5, following), followed by the execution of a speed negotiation subroutine (shown in FIG. 6, following), and then followed by the execution of a topology process subroutine (shown in FIG. 7, following). The method 400 then exits and returns to the calling section (step 404).

FIG. 5 illustrates the execution of a manual mode subroutine as shown by method 500. Method 500 begins (manual mode entry point 502) by determining if the user selection is loop capable (step 504). If yes, a loop topology subroutine is performed (shown in FIG. 5, following). If not, a next determination is made as to whether the user selection is point-to-point capable. If yes, a topology process subroutine is performed (shown in FIG. 7, following). If not, a next determination is made as to whether the user selection is switch capable (step 508). If so, the topology process subroutine is performed (again shown in FIG. 7, following). If not, a next determination is made as to whether the user selection includes manual speed negotiation (step 510). If so, a speed negotiation subroutine is performed (shown in FIG. 6, following). If not, the subroutine exits and returns to the calling section (step 512).

FIG. 5 illustrates an exemplary loop topology subroutine as shown by method 600. Method 600 begins (loop routine entry point 602) with the issuance of a Loop Initialization Protocol (LIP) (step 604). If the LIP is not received from the loop (step 606), the method 600 waits for the LIP from the loop. Otherwise, the method 600 times out, exits, and returns to the calling section (step 616).

If the LIP is received, the method 600 completes loop initialization (step 608). The method 600 then outputs port type and loop capabilities (step 610) to the user. A Fabric LOGIn (FLOGI) is issued (step 612). If an accept (ACC) is received, the method 600 outputs the port type (e.g., NL or FL) (step 614). If the ACC is not received, the method exits and returns to the calling section (again, step 616).

Figure 6:
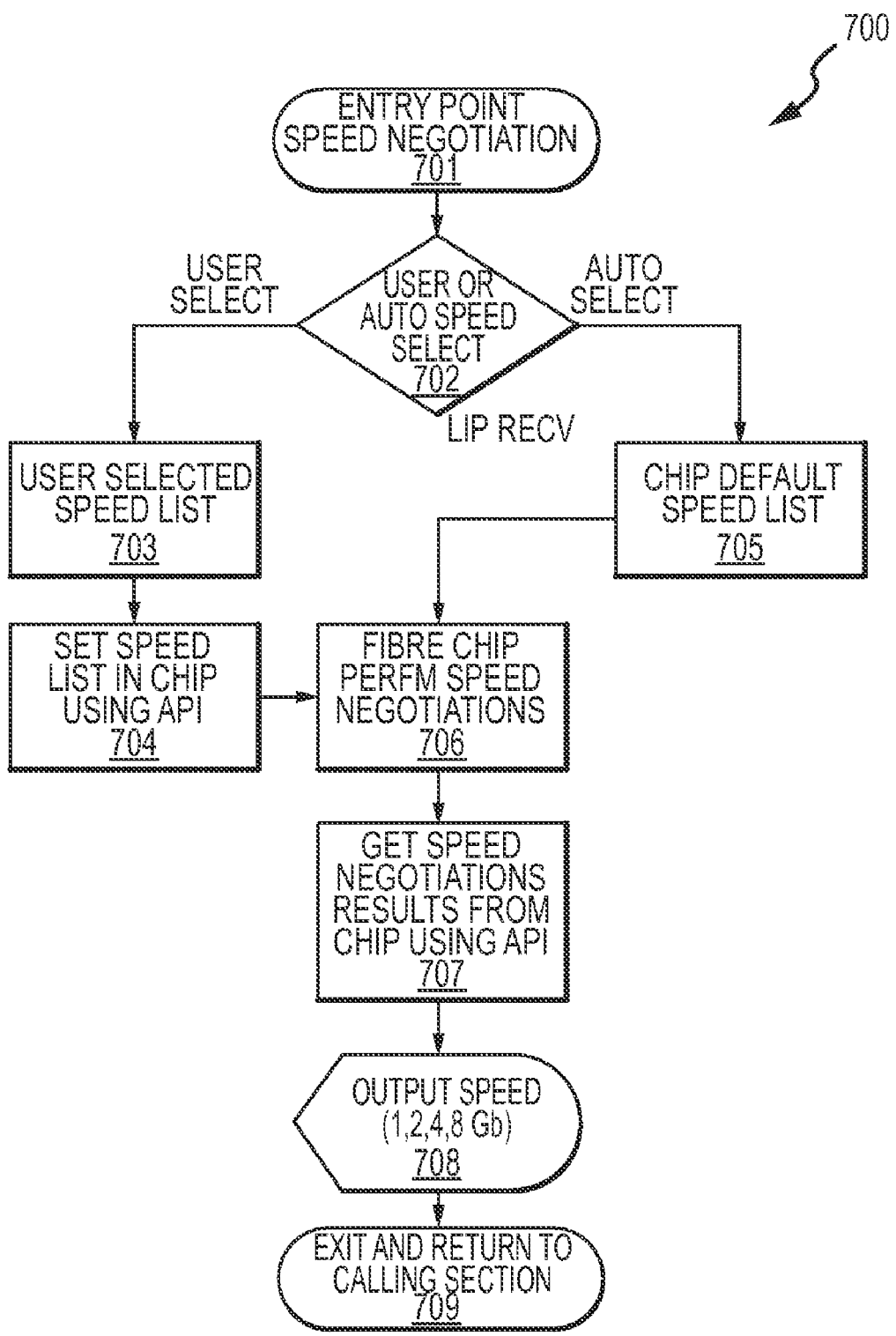
FIG. 6 illustrates an exemplary speed negotiation subroutine.

FIG. 6 illustrates an exemplary speed negotiation subroutine (auto or manual) as shown by method 700. Method 700 begins (speed selection entry point 701), with the determination of whether an auto or manual speed selection has been made (step 702). If the manual process is selected, the user selects the applicable link speed from the previously built speed list (step 703). The link speed is set in the network microchip using the chip's API (step 704).

If auto speed selection is selected, the method then examines the microchip's speed list, and selects a default link speed (step 705). Both manual and auto functionality proceed to step 706 where the network microchip (illustrated here as a fibre channel chip) performs the speed negotiations. The results are then obtained from the microchip, again using the chip's API (step 707). The connected speed, as well as any failed negotiations are output and returned to the user (step 708). The method 700 then exits and returns to the applicable calling section (step 709).

Figure 7:
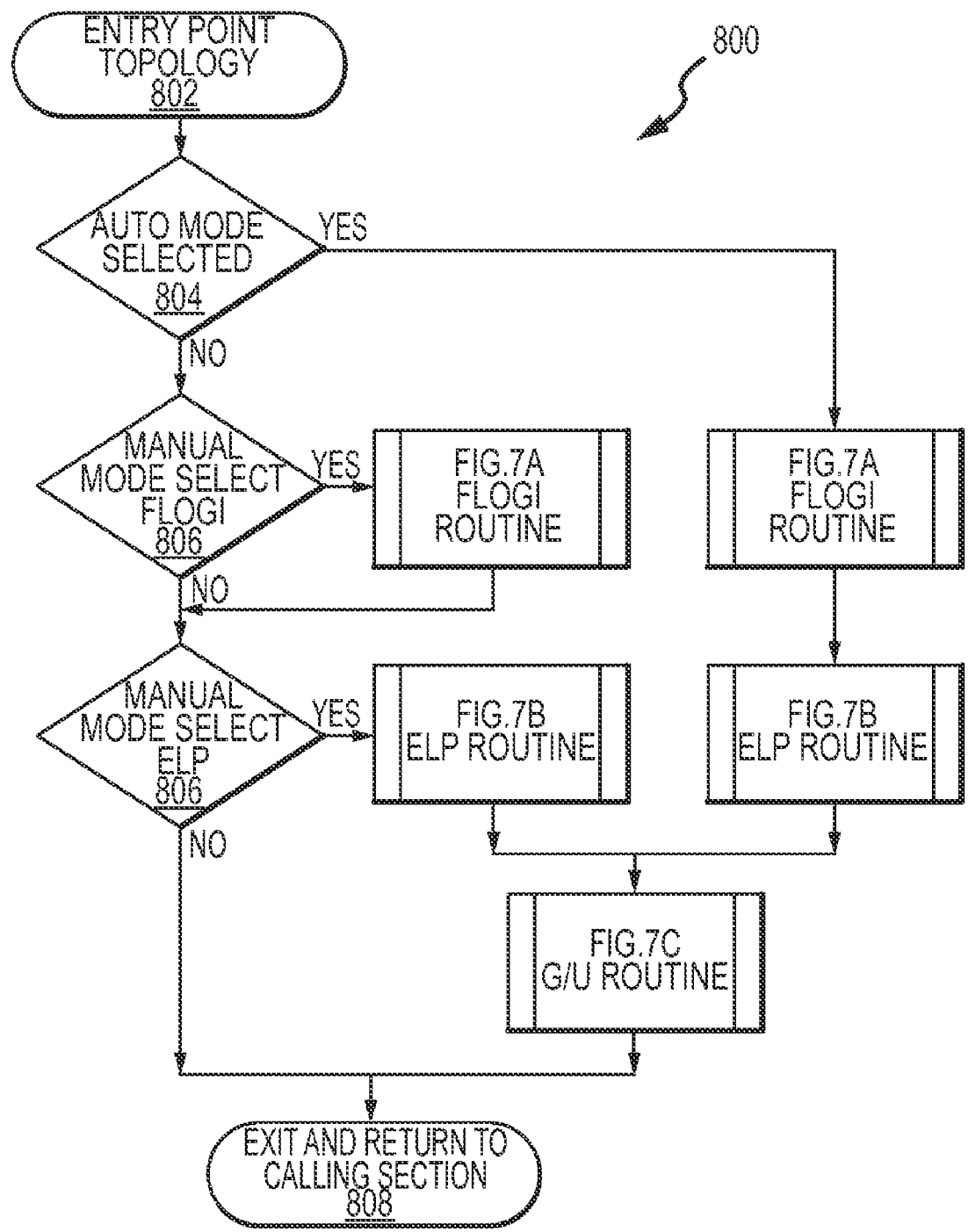
FIG. 7 illustrates an exemplary fibre channel (FC) topology subroutine.

FIG. 7 illustrates an exemplary execution of a fibre channel topology negotiations subroutine as shown by method 800. Method 800 begins (topology entry point 802), with the determination of whether an auto network topology negotiations mode or a manual network topology negotiations mode is selected (steps 804, 806). If auto mode is selected, a FLOGI subroutine is performed as shown in FIG. 7A, following. An Exchange Link Parameter (ELP) subroutine is then performed as shown in FIG. 7B, following. Finally, a generic/universal (G/U) subroutine is performed as shown in FIG. 7C, following.

If manual mode is selected involving a fibre channel fabric, the FLOGI subroutine is performed. If manual mode is selected involving ELP compatible networks, the ELP subroutine is performed, followed by the G/U subroutine. If no, the method 800 exits and returns to the calling section (step 808).

FIGS. 7A, 7B, and 7C, following, illustrate exemplary FLOGI subroutines, ELP subroutines, and G/U subroutines discussed above. FIG. 7A illustrates an exemplary FLOGI subroutine shown by method 810. Method 810 begins (FLOGI entry point 812) by performing a port initialization process (step 814). A FLOGI is issued (step 815). If the ACC is received, the port type is output to the user as gleaned from the FLOGI ACC (e.g., F or N) (step 816). If the ACC is not received, the method 810 exits and returns to the respective calling section (step 818).

FIG. 7B illustrates an exemplary ELP subroutine shown by method 820. Method 820 begins (ELP entry point 822) by again performing a port initialization (step 824). An ELP is issued (step 826). If the ACC is received, the port type gleaned from the ELP ACC (e.g., E or B) is output to the user (step 828). If the ACC is not received, the method 820 exits and returns to the respective calling section (step 830).

FIG. 7C illustrates an exemplary G/U subroutine shown by method 832. Method 832 begins (G/U entry point 834) by determining if an F-port is found (step 836). If no, the method exits and returns to the respective calling section (step 838). If so, the method 832 then determines if an E-port is found (step 840). If no, the method 832 then determines if a B-port is found. Again, if not, the method 832 exits and returns to the respective calling section (again, step 838). If a B-port or E-port is found, the method 832 then outputs the applicable port type (e.g., Gx or U) to the user (step 844), exits, and then returns to the respective calling section (step 838).

While one or more embodiments of the present invention have been illustrated in detail, the skilled artisan will appreciate that modifications and adaptations to those embodiments may be made without departing from the scope of the present invention as set forth in the following claims.

What is claimed is:

1. A portable device for analyzing and configuring a fibre channel link and topology in a computing environment, comprising:
a network microchip programmed to select at least one of an available plurality of operating modes occurring in one of a simultaneous, a concurrent, and a consecutive configuration based on a first user input, wherein the plurality of operating modes include:
a manual speed selection mode for manually selecting a link speed based on a second user input,
an auto speed selection mode for automatically negotiating a highest supported link speed,
an auto topology negotiation mode for discovering and reporting all possible port configurations, and
a manual topology selection mode for selecting a fibre channel topology based on a third user input.

2. The portable device of claim 1, wherein the network microchip is integrated into a portable housing.

3. The portable device of claim 1, further including:
an input, integrated into the portable housing, the input in communication with the network microchip for connection to the fibre channel topology;
a microprocessor in communication with the network microchip for executing computer instructions relating to the plurality of operating modes; and
a memory in communication with the network microchip for storing computer instructions relating to the plurality of operating modes.

4. The portable device of claim 3, further including an indicator to display an operating status.

5. The portable device of claim 3, further including an interface for receiving the first user input or displaying an operating status.

6. The portable device of claim 1, wherein:
the auto speed selection mode is adapted to report a failure to negotiate a first link speed and a successful negotiation of a second link speed to the user, the auto topology negotiation mode is adapted to report a failure to negotiate a first port configuration and a successful negotiation of a second port configuration to the user, and the manual topology selection mode is adapted to report a failure to negotiate a third port configuration and a successful negotiation of a fourth port configuration to the user.

7. The portable device of claim 1, wherein the network microchip supports a Small Computer System Interface (SCSI) communication protocol.

8. A method for analyzing and configuring a fibre channel link and topology in a computing environment using a portable device, comprising:

selecting at least one of an available plurality of operating modes occurring in one of a simultaneous, a concurrent, and a consecutive configuration based on a first user input; and executing the at least one operating mode, wherein executing the at least one operating mode includes at least one of:

manually selecting a link speed based on a second user input, automatically negotiating a highest supported link speed, discovering and reporting all possible port configurations, and manually selecting a network topology based on a third user input.

9. The method of claim 8, further including receiving the first user input.

10. The method of claim 8, further including indicating an operating status of executing the at least one operating mode.

11. The method of claim 8, further including displaying at least one of the link speed, the highest supported link speed, a port configuration, and the fibre channel topology to the user.

12. The method of claim 8, wherein automatically negotiating a highest supported link speed includes at least one of:

reporting a failure to negotiate a first link speed, and
reporting a successful negotiation of a second link speed.

13. The method of claim 8, wherein discovering and reporting all possible port configurations includes at least one of:

reporting a failure to negotiate a first port configuration, and reporting a successful negotiation of a second port configuration.

14. The method of claim 8, wherein manually selecting a fibre channel topology based on a third user input includes at least one of:

reporting a failure to negotiate a first port configuration, and reporting a successful negotiation of a second port configuration.

15. The method of claim 8, further including:

issuing a Fabric LOGIn (FLOGI) or an Exchange Link Parameter (ELP), or discovering an F-Port or E-Port, and reporting a port type to the user.

16. The method of claim 15, further including previous to issuing a FLOGI or an ELP, performing a port or loop initialization.

17. A computer program product for analyzing and configuring a fibre channel link and topology in a computing environment using a portable device, the computer program product comprising a computer-readable storage medium having computer-readable program code portions stored therein, the computer-readable program code portions comprising:

a first executable portion for selecting at least one of an available plurality of operating modes occurring in one of a simultaneous, a concurrent, and a consecutive configuration based on a first user input; and a second executable portion for executing the at least one operating mode, wherein executing the at least one operating mode includes at least one of:

manually selecting a link speed based on a second user input, automatically negotiating a highest supported link speed, discovering and reporting all possible port configurations, and manually selecting a fibre channel topology based on a third user input.

18. The computer program product of claim 17, further including:

a third executable portion for receiving the first user input, and a fourth executable portion for displaying at least one of the link speed, the highest support link speed, a port configuration, and the fibre channel topology to the user.

19. The computer program product of claim 17, further including a third executable portion for indicating an operating status of executing the at least one operating mode.

20. The computer program product of claim 17, wherein the second executable portion for executing the at least one operating mode includes a third executable portion for:

reporting a failure to negotiate a first link speed,
reporting a successful negotiation of a second link speed,
reporting a failure to negotiate a first port configuration, and
reporting a successful negotiation of a second port configuration.

\* \* \* \* \*